United States Patent
Xu et al.

(10) Patent No.: US 10,505,737 B1
(45) Date of Patent: Dec. 10, 2019

(54) SYSTEM AND METHOD FOR BLOCKCHAIN-BASED CONSENT AND CAMPAIGN MANAGEMENT

(71) Applicant: Syniverse Technologies, LLC, Tampa, FL (US)

(72) Inventors: Huiyue Xu, Tampa, FL (US); Jason Gerardi, Tampa, FL (US); Javier Dominguez, Tampa, FL (US); Sara DeBella, Tampa, FL (US); Sreedhar Vemuri, Secunderabad (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/430,615

(22) Filed: Jun. 4, 2019

Related U.S. Application Data

(60) Provisional application No. 62/680,258, filed on Jun. 4, 2018.

(51) Int. Cl.
| | | |
|---|---|---|
| *H04L 9/32* | (2006.01) | |
| *H04L 9/08* | (2006.01) | |
| *G06Q 30/02* | (2012.01) | |
| *H04L 9/06* | (2006.01) | |

(52) U.S. Cl.
CPC ....... *H04L 9/3228* (2013.01); *G06Q 30/0258* (2013.01); *H04L 9/0643* (2013.01); *H04L 9/0825* (2013.01); *H04L 2209/38* (2013.01)

(58) Field of Classification Search
CPC ... H04L 9/3228; H04L 9/0825; H04L 9/0643; H04L 2209/38; G06Q 30/0258
See application file for complete search history.

(56) References Cited

U.S. PATENT DOCUMENTS

| | | | | |
|---|---|---|---|---|
| 9,202,016 | B2 * | 12/2015 | Counterman | G06F 21/00 |
| 9,444,948 | B1 * | 9/2016 | Ren | H04M 15/72 |
| 10,142,333 | B1 * | 11/2018 | Griffin | H04L 63/0861 |
| 10,148,433 | B1 * | 12/2018 | Lozin | H04L 9/0825 |
| 2002/0035697 | A1 * | 3/2002 | McCurdy | G06F 21/10 726/3 |
| 2002/0094870 | A1 * | 7/2002 | Murray | G06Q 10/10 463/42 |
| 2003/0097451 | A1 * | 5/2003 | Bjorksten | G06F 21/10 709/228 |

(Continued)

*Primary Examiner* — Darren B Schwartz
(74) *Attorney, Agent, or Firm* — Molly L. Sauter; Smith & Hopen, P.A.

(57) ABSTRACT

A specialized networking and application system which includes a consent and campaign blockchain network for advertising campaigns. Off-chain databases are used to store a user's personal data records that are not suitable to be stored in blockchain ledger system. A user receives an opt-in request link prompting the user to consent to receiving advertising campaign messages. The invention verifies user's consent using a single-use token and, if the verification is successful, the advertising campaign messages are transmitted to the user. The invention enables users to centrally manage their consents/preferences for various enterprises, various channels and/or campaigns, storing encrypted subscribers' consents/preferences data into trusted blockchain network, validating the preferences before delivering a campaign message to the user, and providing audit trials and historical campaign messages with analytic data to the users.

20 Claims, 12 Drawing Sheets

(56) References Cited

U.S. PATENT DOCUMENTS

| | | | |
|---|---|---|---|
| 2009/0235347 A1* | 9/2009 | Syed | H04L 9/3213 726/10 |
| 2010/0185546 A1* | 7/2010 | Pollard | G06Q 10/0637 705/80 |
| 2010/0185656 A1* | 7/2010 | Pollard | G06F 21/6245 707/769 |
| 2011/0016320 A1* | 1/2011 | Bergsten | H04L 63/08 713/170 |
| 2011/0246308 A1* | 10/2011 | Segall | G06Q 10/109 705/14.66 |
| 2011/0283365 A1* | 11/2011 | Moritz | G06F 21/10 726/28 |
| 2012/0036360 A1* | 2/2012 | Bassu | H04L 9/3228 713/168 |
| 2013/0246199 A1* | 9/2013 | Carlson | G06Q 20/20 705/16 |
| 2015/0256542 A1* | 9/2015 | Alasingara Bhattachar | G06F 21/31 713/182 |
| 2015/0319142 A1* | 11/2015 | Herberg | H04L 63/0428 713/171 |
| 2016/0134599 A1* | 5/2016 | Ross | H04L 63/08 713/168 |
| 2017/0046689 A1* | 2/2017 | Lohe | G06F 12/1408 |
| 2017/0257358 A1* | 9/2017 | Ebrahimi | H04L 9/3247 |
| 2017/0316162 A1* | 11/2017 | Wall Warner | G16H 10/60 |
| 2018/0165598 A1* | 6/2018 | Saxena | G06N 5/04 |
| 2018/0268420 A1* | 9/2018 | Maselli | G06Q 10/06 |
| 2018/0314809 A1* | 11/2018 | Mintz | H04L 63/10 |
| 2019/0028277 A1* | 1/2019 | Jayachandran | H04L 9/3247 |
| 2019/0052466 A1* | 2/2019 | Bettger | H04L 63/123 |
| 2019/0087892 A1* | 3/2019 | Pinski | G06Q 40/02 |
| 2019/0147397 A1* | 5/2019 | Hodges | G06F 16/27 |
| 2019/0163887 A1* | 5/2019 | Frederick | G06F 21/31 |
| 2019/0164140 A1* | 5/2019 | Pasupula | G06Q 20/123 |
| 2019/0173873 A1* | 6/2019 | Brown | G06F 16/93 |
| 2019/0236286 A1* | 8/2019 | Scriber | G06F 16/27 |

* cited by examiner

| Field | Description |
|---|---|
| Created Timestamp | The time when the campaign is created |
| User Id | The ID of Enterprise that creates the Campaign |
| Personal Attributes[] | |
| Attribute Type | The type of personal attribute info, which can be first name, last name, cell phone, work phone, home address, work address, date of birth, year of birth, and etc. |
| Version | The version of the value for the specific attribute info, which is used as a reference in the consent transaction that is recorded in the blockchain |
| Value | The actual value of the attribute, which is the personal private information, and is not stored in the blockchain |
| Update Timestamp | The time when the version of value is update |
| Preference Attributes[] | |
| Attribute Type | The preference for being engaged with specific campaign |
| Version | The type of preference attribute, which can be email, text, call, mail, and etc. |
| Value | The version of the value for the specific attribute info, which is used as a reference in the consent transaction that is recorded in the blockchain |
| Update Timestamp | The actual value of the attribute, which is the personal private information, and is not stored in the blockchain |
| | The time when the version of value is update |

FIG. 5

| Field | Description |
|---|---|
| Created Timestamp | The time when the campaign is created |
| Enterprise ID | The ID of Enterprise that creates the Campaign |
| Campaign ID | The unique ID for the campaign |
| Campaign Subject | The title of the campaign |
| Campaign Start Time | The campaign start time |
| Campaign End Time | The campaign end time |
| Campaign Description | The detail description of the campaign |
| Campaign Attributes [] | The attributes related with this campaign, extensible format that can include different attributes for different campaign |
| Attribute | The attributes, such as target audience, market, delivery time, and etc. |
| Value | The value for the attribute |
| Description | The description for the attribute |
| Consent Attributes[] | The consent attributes related with this campaign, extensible format that can include different Consent attributes for different campaign, e.g. Campaign A needs the user to agree to access to their phone number and age, while Campaign B needs to access the user's location, email address and etc. |
| Attribute | The personal attribute info that need user to agree for the disclosure to this campaign |
| Reason | The reason on why the user need to allow the campaign accesses the specific attribute |

FIG. 6

| Field | Description |
|---|---|
| Transaction Timestamp | The time when the campaign is created |
| Campaign ID | The unique ID for the campaign |
| User ID | The unique ID for the user |
| Event Type | The event type of this transaction, such as Opt-in, Opt-out, Removed, Updated |
| Consent Channel {} | The channel how the user consented, could be scanned document, online form, website, link, text message, audio recording, and etc. channel that can show the proof of confirmation of the consent |
| Channel Attribute | The attribute of the channel |
| Channel Value | The value of the specific attribute |
| Consent Attributes[] | The consent attributes related with this campaign, extensible format that can include different Consent attributes for different campaign, e.g. Campaign A needs the user to agree to access to their phone number and age, while Campaign B needs to access the user's location, email address and etc. |
| Attribute | The personal attribute info that the user agree for the disclosure to this campaign |
| Version | The version of specific attribute that the user use for this consent transaction, in order to avoid storing the attribute value in the blockchain that cannot be modified after the transaction is recorded by the blockchain |
| Engagement Preferences {} | |
| Attribute | The Preferences type that the user consent to be engaged |
| Version | The version of preferences value that the user consent to be engaged, the actual value is treated as sensitive personal data, thus the preference value is not stored in the blockchain |

FIG. 7

| Field | Description |
|---|---|
| Created Timestamp | The time when the campaign is created |
| Campaign ID | The unique ID for the campaign |
| User ID | The unique ID for the user |
| Content ID | The detail description of the campaign |
| Transaction Type | The type of the campaign transaction, such as opt-in request, opt-in response, survey, invitation, notification, and etc. |
| Transaction Attributes [] | The attributes related with this campaign transaction, extensible format that can include different attributes for different campaign |
| Attribute | The attributes, such as event channel, agency, and etc. |
| Value | The value for the attribute |

SYSTEM AND METHOD FOR BLOCKCHAIN-BASED CONSENT AND CAMPAIGN MANAGEMENT

CROSS-REFERENCE TO RELATED APPLICATIONS

This application claims priority to U.S. Provisional Patent Application No. 62/680,258 entitled "System and Method of Blockchain-Based Consent and Campaign Management", filed on Jun. 4, 2018, the entirety of which is incorporated herein by reference.

BACKGROUND OF THE INVENTION

It is crucial for companies to protect the privacy of their users before sending mobile communications or accessing personally identifiable information (PII). Consent Management services add a layer of trust between companies and their users by acquiring and storing consent (or permission) before accessing user related data or sending various types of mobile communications.

The consent management manages the consent status, tracking, and auditing to ensure compliance with local laws and regulations. The goal is to respect the privacy of the users, and this convention ensures that none of the subscriber credentials are distributed, leaving the subscriber in control.

However, currently there is no common place for users to manage their consent/opt-in preferences. Currently, users need to interface with multiple companies and may need to manage their consent/opt-in preference in multiple ways. The absence of a central user consent management system leads to replication of the process that could be time consuming and tedious for the users whenever they need to modify or delete their personal information and consent with the consent management system of each individual enterprise.

SUMMARY OF THE INVENTION

This invention consists of specialized networking and application system, including an exemplified consent and campaign blockchain network, allowing different participants to join the network and implement their specific functions. In an embodiment, the invention includes multiple application nodes to implement various functions to support the requirements of different participants. The invention further includes off-chain databases to store data records that are not suitable to be stored in the blockchain ledger system. The off-chain data record could be personal records that include private attributes that must be kept securely and need to be modified or deleted.

In one embodiment, the present invention provides a method for consent and campaign management which includes, transmitting, by an enterprise, an opt-in request to a user, the opt-in request for inviting the user to consent to receive one or more messages related to a campaign, wherein the opt-in request comprises a link to a blockchain network. The method further includes, generating a single-use token in response to the user accessing the blockchain network via the link to the blockchain network, transmitting the single-use token to the user and, responsive to the user logging into the blockchain network using the single-use token, issuing a private key to the user. The method further includes, receiving a user's response to the opt-in request, wherein the user's response includes the user's personal data, encrypting the user's personal data using the private key and storing the user's personal data in an off-chain database, logging the user's response to the opt-in request into the blockchain network, validating the user's opt-in response as consent to receive messages pertaining to the campaign and transmitting the campaign message to the user based upon the validation of the user's opt-in response and logging delivery of the campaign message into the blockchain network.

This invention enables users to centrally manage their consents/preferences for various enterprises, various channels and/or campaigns, storing encrypted subscribers' consents/preferences data into trusted blockchain network, validating the preferences before delivering a campaign message (via text messaging, email, voice call and etc.) to the subscriber, providing audit trails and historical campaign messages with analytic data to the users.

This invention enables enterprises to communicate with a distributed blockchain computer network, update their campaign info and subscription channels into the blockchain network, validate a subscriber's preferences before delivering marketing campaign messages, conduct campaign models based on historical data to model the potential campaign outcome prior to actual implementation.

The invention further enables legal/regulators and/or $3^{rd}$ party auditors to communicate with a distributed blockchain computer network, conduct audit of each individual user's engagement history, and also each company's campaign status and the recipients.

BRIEF DESCRIPTION OF THE DRAWINGS

For a fuller understanding of the invention, reference should be made to the following detailed disclosure, taken in connection with the accompanying drawings, in which:

FIG. 5 is a table containing exemplary data structures of personal information attributes stored in the off-chain database of one embodiment of the present invention.

FIG. 6 is a table containing a data structure of the campaign meta data stored in the off-chain database of one embodiment of the present invention.

FIG. 7 is a table containing a data structure of the consent transaction meta data stored in the blockchain distributed ledger system of one embodiment of the present invention.

FIG. 8 is a table containing a data structure of the campaign transaction meta data stored in the blockchain distributed ledger system of one embodiment of the present invention.

DETAILED DESCRIPTION OF THE INVENTION

Enterprises experience challenges managing various regulations, including GDPR (General Data Protection Regulation) and TCPA (Telephone Consumer Protection Act) wherein managing subscriber opt-in and consent is very difficult and complex because different industries have different needs each country may have different rules and regulations.

Both Mobile Network Operators (MNOs) and Enterprises are faced with these challenges, which include validating subscriber contact details while also insuring subscriber privacy. There is an overall lack of visibility as to who/what/where/when personal information is shared, which is not desirable.

Blockchain is commonly described as a digital, decentralized ledger that keeps a record of all transactions that take place across a peer-to-peer network so that participants can transfer assets across the Internet without the need for a centralized third party. As such, blockchain networks provide immutable records so consent data cannot ever be deleted, thus providing a trusted audit trail. In the present invention, blockchain network ledgers are used to record the subscriber opt-in, campaign message sent to a subscriber, method used, timestamp, etc. along with a subscriber response if any (i.e. opt-out). Additionally, an offline, secure database with encrypted subscriber data is used to ensure safety of personal data.

Figure 1:
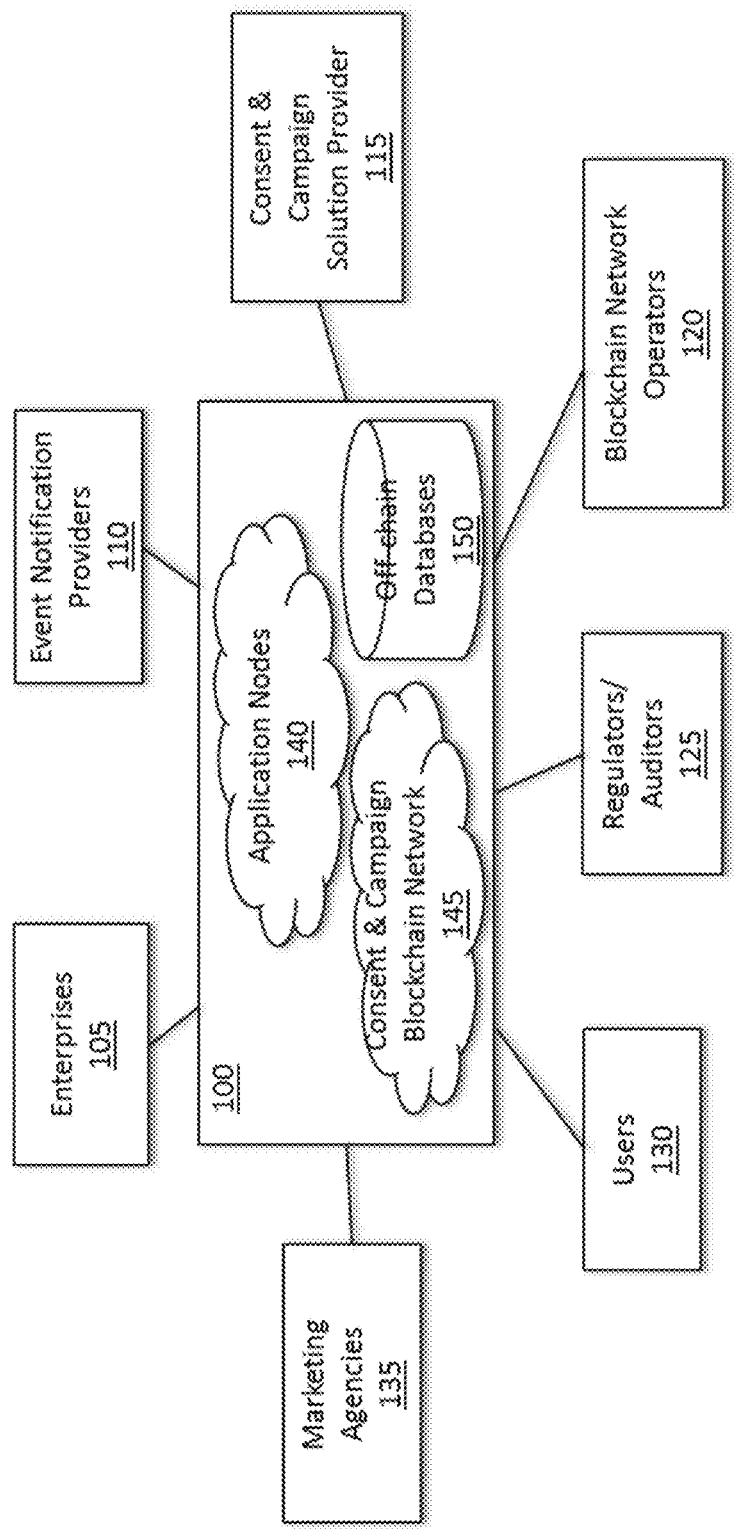
FIG. 1 is a block diagram schematically depicting the consent blockchain participants, in accordance with an embodiment of the present invention.

In the embodiment depicted in FIG. 1, the invention is a specialized blockchain networking and application system 100 that includes an exemplified consent and campaign blockchain network 145, allowing different participants to join the network and implement their specific functions. This embodiment includes multiple application nodes 140 to implement various functions to support the requirements of different participants, and also includes off-chain databases 150 to store data records that are not suitable for storage in the blockchain ledger system of the consent and campaign blockchain network 145. The off-chain data records stored in the off-chain databases 150 could be personal records that include private attributes that must be kept securely and might need to be modified or deleted.

As shown in FIG. 1, the consent and campaign management system 100 includes multiple participants. The users 130 participate to manage their personal profile and consent information. The enterprises 105 and marketing agencies 135 participate to manage their companies campaign information and to trigger marketing campaigns towards users 130 that have opted-in for a specific campaign. The regulators and/or auditors 125 conduct audits based on the blockchain transaction records in the consent and campaign blockchain network 145. The event notification providers 110 verify the consent information, deliver the campaign messages toward opt-in users, and log the campaign transactions into the blockchain. The blockchain network operators 120 operate the consent and campaign blockchain network 145 and the consent and campaign solution provider 115 develops and enhances the solution and provides application software to the users 130.

Figure 2:
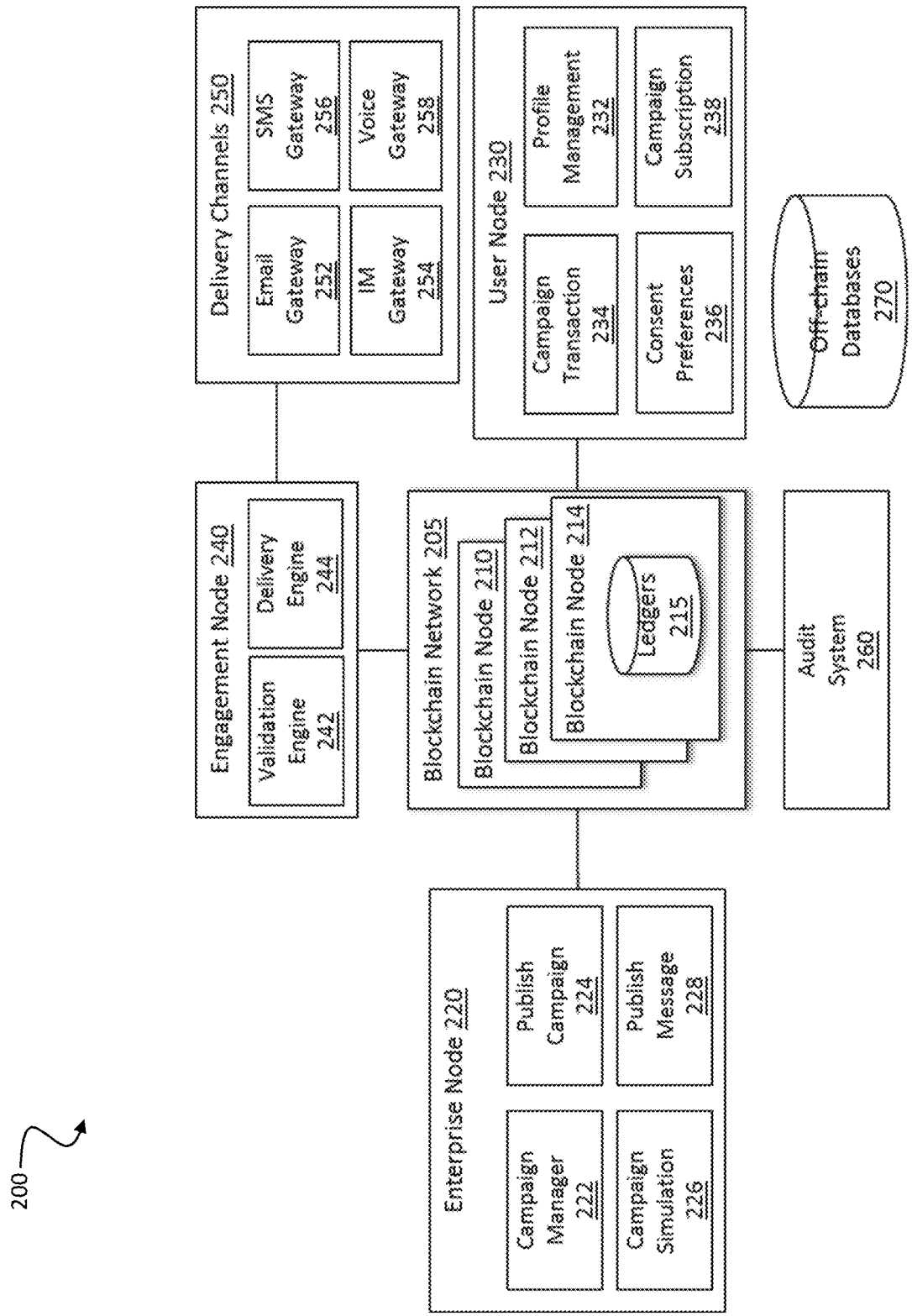
FIG. 2 is a block diagram schematically depicting exemplary software components of the present invention.

FIG. 2 provides an exemplified block diagram depicting various software components of a consent and campaign management system 200 in accordance with the present invention. The various software components illustrated in FIG. 2 are exemplary in nature and are not intended to be limiting. The blockchain network 205 of the consent and campaign management system 200 includes distributed blockchain nodes 210, 212, 214 that share the same ledgers database 215, thereby creating an immutable, trustable record trail due to the nature of blockchain technologies. The enterprise node 220 includes specialized software modules, including the campaign manager module 222 allowing the enterprise to manage their campaign information, the campaign simulation module 226 to simulate the campaign delivery effectiveness before the enterprise 220 starts the actual campaign messages, the publish campaign module 224 to start a new campaign and to collect the user's consent information and the publish message module 228 to generate campaign messages and deliver the messages to the already opted-in user, based on the user's preferred channel, time, date and etc.

The user node 230 shown in FIG. 2 includes software modules to fulfill the needs of the user with respect to consent and campaign management. The profile management module 232 securely adds/updates/deletes user's personal information. An update of personal information could also trigger an update of consent toward each specific campaign if the corresponding personal information is used. The campaign subscription module 238 manages subscription and unsubscription of the enterprise campaign and also manages sharing of each individual personal attribution for different campaigns. The campaign transaction module 234 manages the message transactions that the enterprise 220 has delivered to the user 230 as part of the campaign event. The consent preferences module 236 allows the users 230 to define their preferences toward each campaign.

The embodiment depicted in FIG. 2 also includes an engagement node 240 that manages the delivery of campaign messages to individual users 230. The engagement node 240 includes the validation engine 242 that validates the user's opt-in information and preferences before initiating delivery of a campaign message to the user 230, thus ensuring that the message delivery follows the regulatory requirements. The delivery engine 244 of the engagement node 240 interfaces with various external delivery channels 250, such as an email gateway 252, to deliver the campaign message to the user 230 via email, SMS (Short Messaging Service) gateway 256 to deliver the campaign message to the user 230 via text message, IM (Instant Messaging) gateway 254 to deliver the campaign message to the user 230 via instant message and a voice gateway 258 to deliver the campaign message to the user 230 via voice.

The consent and campaign management 200 further includes an software implemented audit system 260 to conduct audits based on the blockchain transaction records in the consent and campaign blockchain network 205 and the off-chain databases 270 to store the users data records that are not suitable for storage in the blockchain ledger 215 of the consent and campaign blockchain network 205.

According to the GDPR (General Data Protection Regulation) regulatory requirements, the consent and campaign management system must keep the corresponding records to demonstrate when and how the enterprise obtained consent from participants (users) 230 including the evidence of the following:

Who consented to the messaging campaign, such as the name of the user or other identifier (e.g. online user name, session ID), which should be included in the record When the participants consented, such as a copy of dated document, an online record with a timestamp, and/or a note of time and date which was made at time of conversation What the participants were told, such as master copy of document or data capture form containing consent statement used at time, or record of scripts used in getting oral consent How the participants consented, such as relevant document or data capture form for online consent data submitted as well as a timestamp to link to the relevant version of the data capture form, a note of oral conversation but not necessarily a full record of the conversation, an audio recording of confirmation of the consent, etc.

Figure 3:
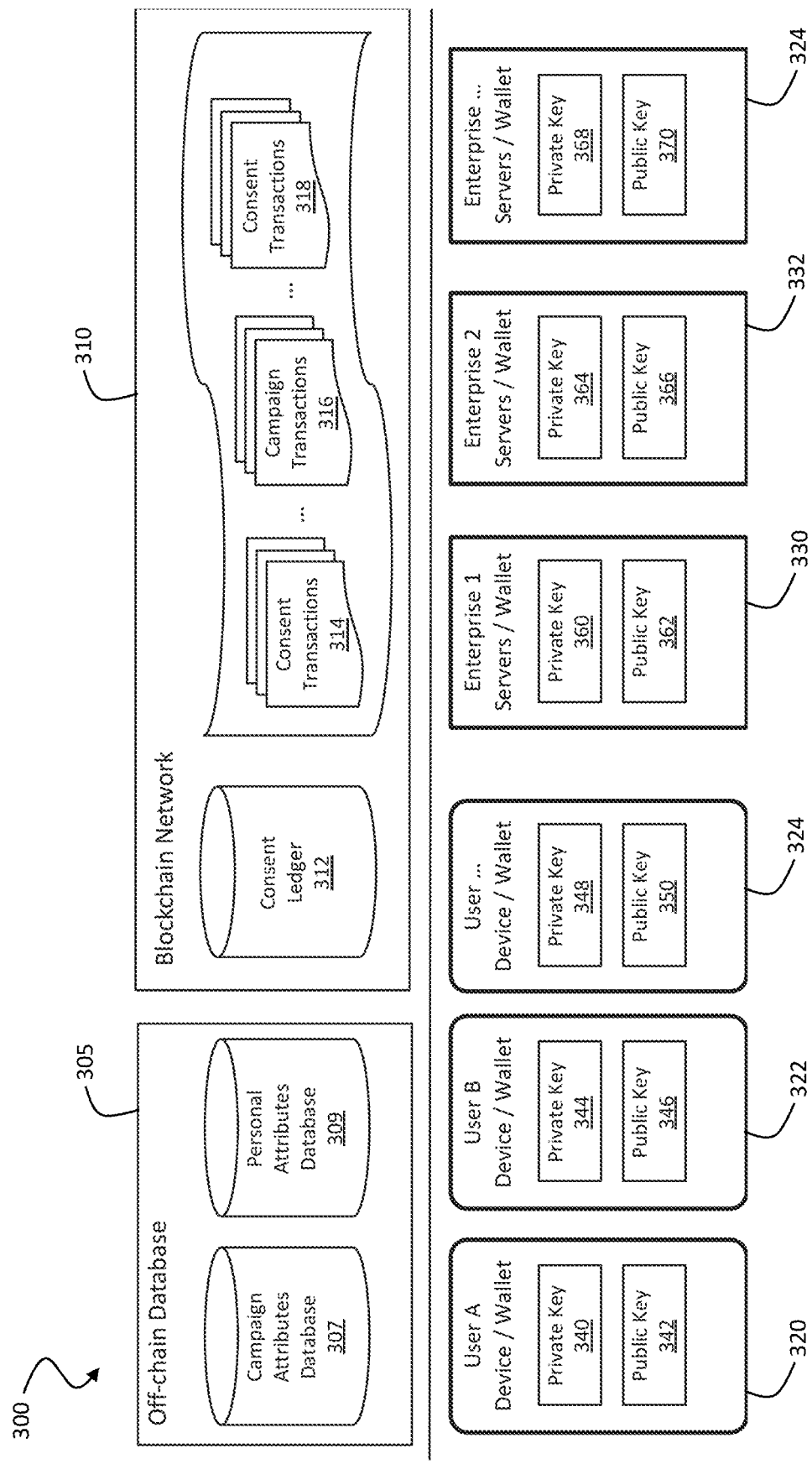
FIG. 3 is a block diagram schematically depicting the data models related to the campaign, consent attributes and transactions stored in off-chain and blockchain distributed ledger of one embodiment of the present invention.

If the user has withdrawn consent, and if so the date and time on which the consent was withdrawn The block diagram of FIG. 3 illustrates various data models 300 related to the campaign, consent attributes and transactions stored in an off-chain database 305 and a blockchain distributed network 310. The exemplary off-chain database 305 includes a campaign attributes database 307 to host the campaign attributes data records and a personal attributes database 309 to host the personal attributes data records. The exemplary blockchain network 310 as shown in the embodiment of FIG. 3 includes a consent ledger, 312 that keeps the most current opt-in and opt-out consent associated with the users and the enterprise campaign, while the blockchain nodes contain the consent transactions 314, 318 and the campaign transactions 316. The consent transactions nodes 314, 318 include detailed information pertaining to the consent, such as consent type. The information contained in the consent transactions nodes 314, 318 can be used to update and verify the consent ledger 312, thereby forming a unique and auditable trial for consent history. No personal attributes are included in the consent ledger and consent transactions fields. The campaign transactions node 316 includes messages delivered to the opt-in users, which can also be used as an auditable record to show the consent evidences and the message history.

The data model 300 as depicted in FIG. 3 also includes user device/wallets 320, 322, 324, each containing a private key 340, 344, 348 and a public key 342, 346, 350 associated with each of the users. The private key 340, 344, 348 is used to encrypt the personal attributes stored in the personal attributes database 309 of off-chain databases 305. The private key 340, 344, 348 is stored only at the user device side. Because the encrypted data stored in the off-chain databases 305 for the particular user cannot be changed, the invention ensures the authenticity of the data. Third parties who need to access the user's personal information must use the user's public key 342, 346, 350.

The data model 300 depicted in FIG. 3 also includes enterprise servers/wallets 330, 332, 334 containing private keys 360, 364, 368 and public keys 362, 366, 370 associated with each of the enterprises participating in a campaign. The private keys 360, 364, 368 are used to encrypt the campaign attributes stored in the campaign attributes database 307 of the off-chain campaign databases 305. Because the private keys 360, 364, 368 are securely stored only at the enterprise server side in the enterprise servers/wallet 330, 332, 334, the encrypted data stored in the off-chain databases 305 for the particular enterprise cannot be changed, thereby ensuring the authenticity of the data. Third parties who need to access the campaign info must use the public key 362, 366, 370 of the specific enterprise.

Figure 4:
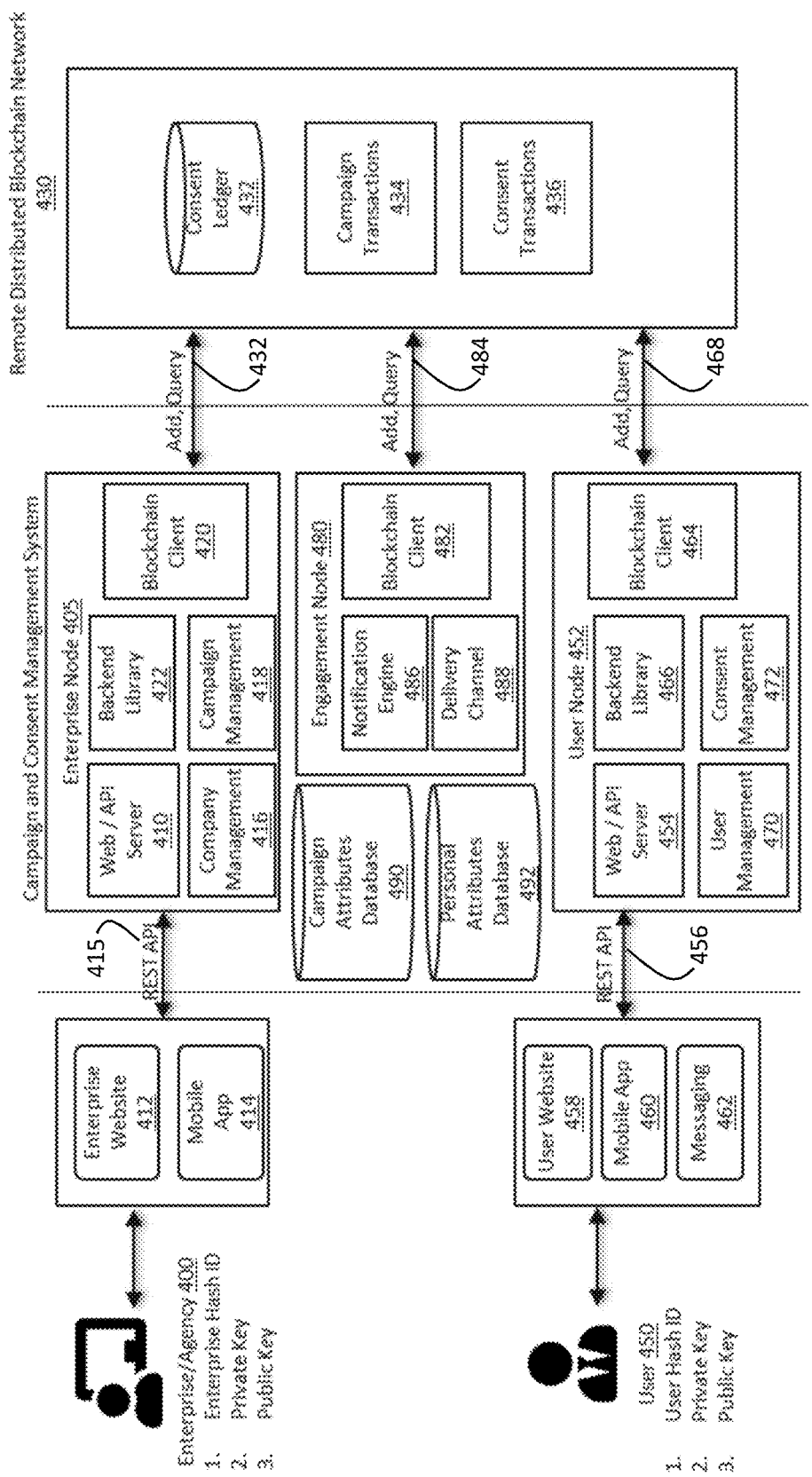
FIG. 4 is a block diagram schematically depicting the system interaction among the enterprise, agency, user and delivery channels of one embodiment of the present invention.

As further depicted in FIG. 4, in an exemplary embodiment, an enterprise/agency 400 may interface with an enterprise node 405 of the campaign and consent management system. In this embodiment, the enterprise node 405 may implement a Web or API (Application Programming Interface) server 410 that may use a REST (Representational State Transfer) API 415, as an example, for the interaction with the enterprise websites 412 or mobile apps 414. The enterprise node 405 may additionally implement a blockchain client 420 and backend library 422 that abstracts the interaction with the remote distributed blockchain network 430 for the insertion or data query 432 within the blockchain 430. As previously described, the blockchain 430 includes a consent ledger 432 that keeps the most current opt-in and opt-out consent associated with the users and the enterprise campaign, while the blockchain nodes contain the consent transactions 436, and the campaign transactions 434. Similarly, a user node 452 associated with a user 450 may implement a Web or API server 454 that uses REST API 456, as an example, for the interaction with the user web sites 458, mobile apps 460 or other messaging channels 462. The user node 452 may additionally implement a blockchain client 464 and a backend library 466 that abstracts the interaction with the remote distributed blockchain network 430 for the insertion or data query 468 with the blockchain 430. The user node 452 may additionally implement user management 470 and consent management 472 associated with the user 450. Similarly, the engagement node 480 may also implement a blockchain client 482 that abstracts the interaction with the remote distributed blockchain network 430 for the insertion or data query 484 with the blockchain. More specifically, the data to be inserted into the campaign transactions of the blockchain network 430 is the campaign transaction, while the data to be queried from the consent transactions 436 of the blockchain network 430 is the consent ledger 432 that the engagement node 480 must validate the consent confirmation from the consent ledger 432 using the notification engine 486 prior to delivering the campaign message to the user 450 over the delivery channel 488. As previously descried, the campaign and consent management system may further include a campaign attributes database 490 to host the campaign attributes data records and a personal attributes database 492 to host the personal attributes data records.

FIG. 5 depicts an exemplary data structure for the personal information meta data to be stored and managed by the off-chain database and FIG. 6 depicts an exemplary data structure for the campaign meta data to be stored and managed by the off-chain database.

FIG. 7 depicts an exemplary data structure for the consent transaction meta data that is to be stored and tracked by the blockchain network and FIG. 8 depicts an exemplary data structure for the campaign transaction meta data that is to be stored and tracked by the blockchain network. In accordance with various embodiments of the present invention, these data structures are specially designed to exclude any actual personal information values in the blockchain in order to fulfill the regulatory requirements to keep the data secure and to allow the data provider (e.g. the user) to erase their personal data completely from the off-chain database, thus preserving the user's right that their personal data can be forgotten.

Figure 9:
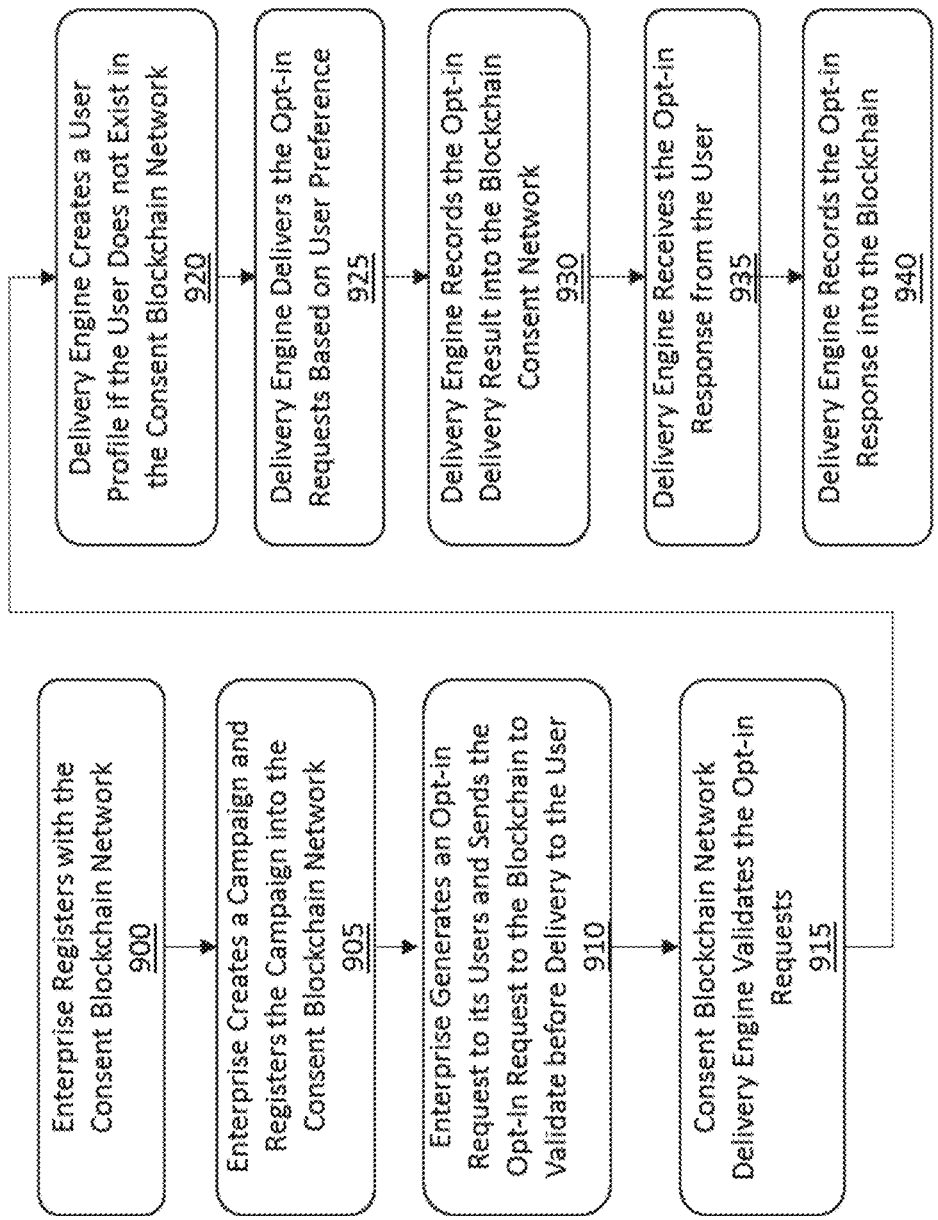
FIG. 9 is a flowchart depicting the enterprise campaign creation and user opt-in procedures according to an embodiment of the present invention.

FIG. 9 illustrates an exemplary enterprise registration and campaign consent delivery method, in accordance with an embodiment of the present invention. As illustrated, in a first step 900 the enterprise registers with the consent blockchain network. In a next step 905, the enterprise creates a campaign and registers the campaign into the consent blockchain network. At a next step 910, the enterprise generates an opt-in request to its users and sends it to the blockchain to validate before delivery to the users. At step 915, the delivery engine of the consent blockchain network then validates the opt-in requests. If the user does not exist in the blockchain, then at step 920, the delivery engine creates a user profile for the user and then at step 925 the delivery engine delivers the opt-in requests based on one or more user preferences, which may include delivery via SMS, email, IM, etc. At step 930, the delivery engine then records the opt-in delivery result into the consent blockchain network. The delivery engine then receives the opt-in response from the user at step 935 and then records the opt-in response as an event into the consent transaction in the consent blockchain network at step 940, updating the consent ledger accordingly.

Figure 10:
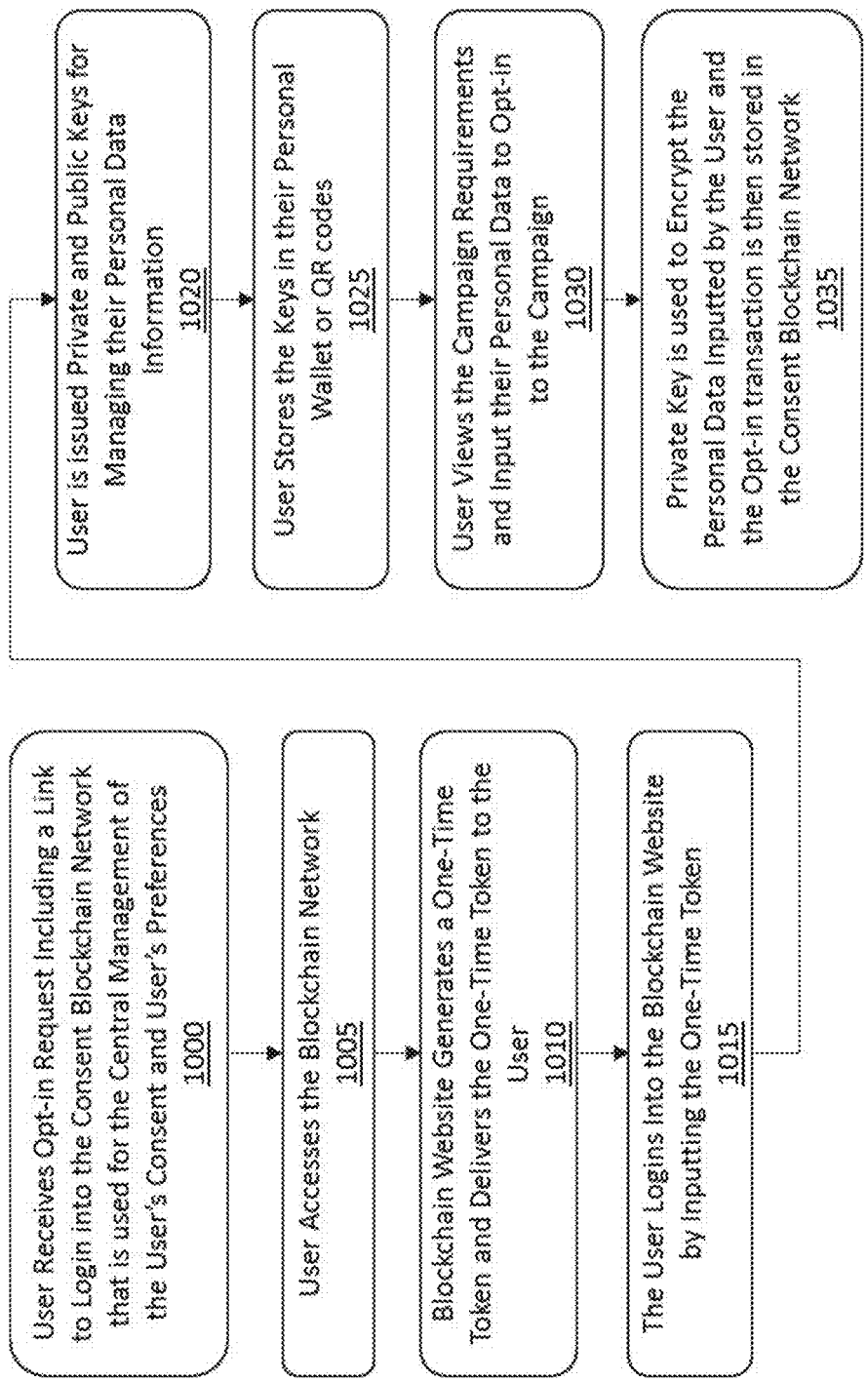
FIG. 10 is a flowchart depicting the user registration and opt-in procedure according to an embodiment of the present invention.

FIG. 10 illustrates an exemplary user registration and consent confirmation method, in accordance with an embodiment of the present invention. At a first step 1000, the user receives an opt-in request, which includes a link to log into the user website that is enabled by the Blockchain technology and is used for the central management of the user's consent and user's preferences. At a next step 1005, the user then selects the link to access the blockchain website via phone number, email address, etc. The blockchain website then generates a one-time token and then delivers it to the user via SMS, email, etc. at step 1010 to validate the user's account. At step 1015, the user logs into the blockchain website by inputting the one-time token. After logging into the blockchain website, the user is then issued private and public keys for managing the user's personal data information at step 1020. At step 1025, the user can then store the issued private and public keys in the personal wallet or QR codes. At step 1030, the user can view the campaign requirements and input their personal data to opt-in for the messaging campaign. The private key is then used to encrypt the data inputted by the user and the opt-in transaction is stored in the blockchain at a final step 1035. If the user has already used the system for other campaigns, he/she can also view campaign information for those campaigns at the same blockchain website.

Figure 11:
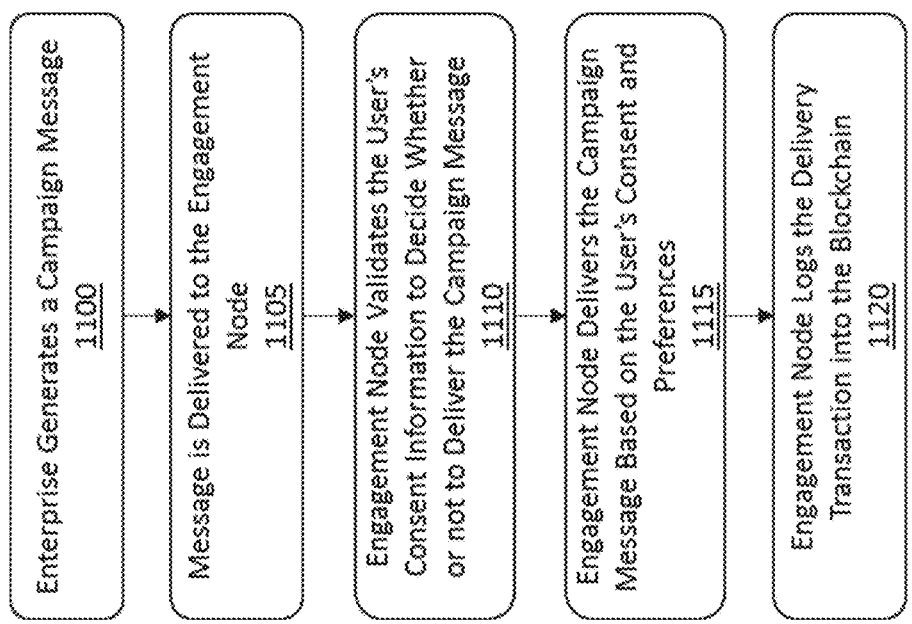
FIG. 11 is a flowchart schematically depicting an enterprise campaign message delivery process according to an embodiment of the present invention.

FIG. 11 illustrates an exemplary enterprise campaign message delivery process, in accordance with an embodiment of the present invention. In a first step 1100, the enterprise logs into the enterprise website and generates a campaign message, which is then delivered to the engagement node at a next step 1105. The engagement node then validates the user's consent information at step 1110 to decide whether to deliver the message to the user. The engagement node then delivers the campaign message to the user at step 1115 if the engagement node validation step determines that the campaign message should be delivered to the user based on the user's consent and preference. At a final step 1120, the engagement node logs the delivery transaction into the blockchain as one campaign transaction.

Figure 12:
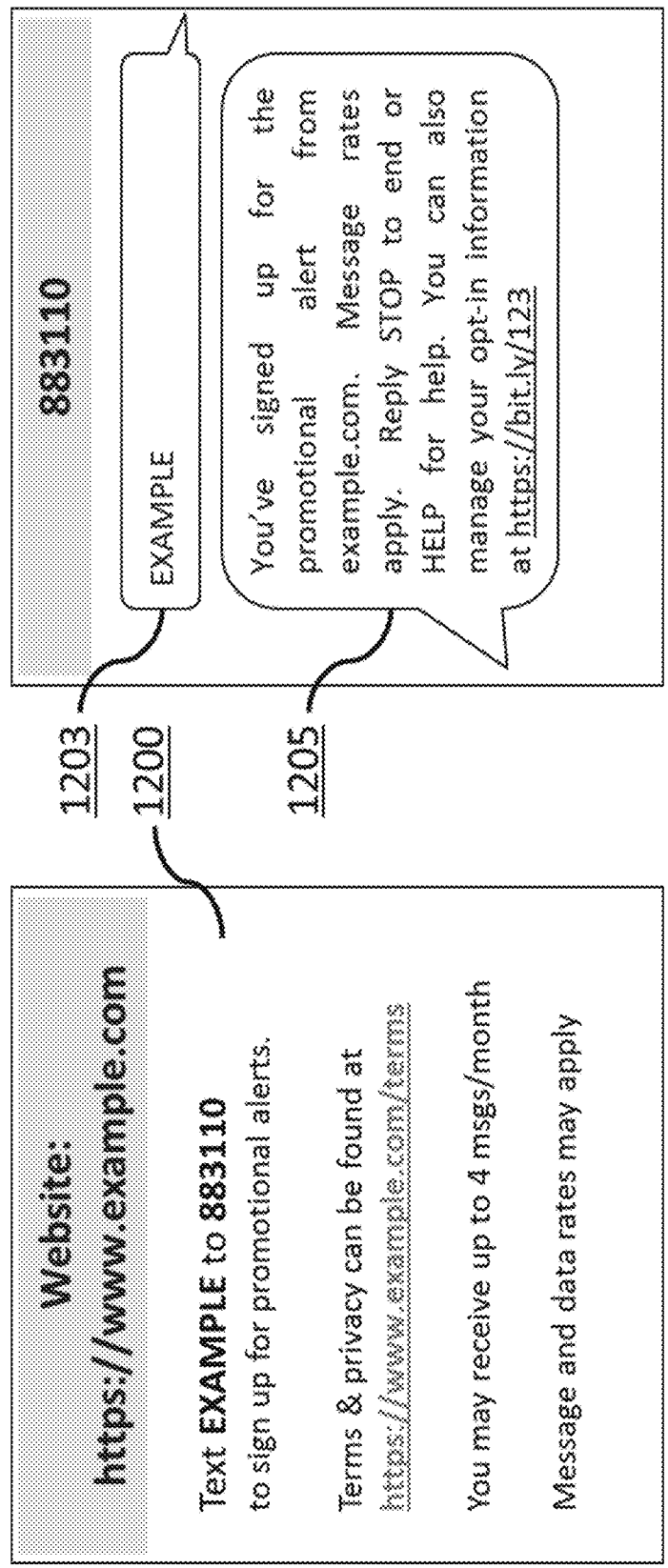
FIG. 12 is an exemplary text message containing a website link to central consent portal according an embodiment of the present invention.

FIG. 12 illustrates an exemplary enterprise website instruction and SMS message exchange between a user and the engagement node of the campaign and consent management system, in accordance with an embodiment of the present invention. In a first step 1200, the enterprise publishes an instruction on its website (e.g. https://www.example.com) asking the user to send text 1203 "EXAMPLE" to the short code "883110" in order to sign up for the promotional alerts. Upon receiving the text message sent by the user, the engagement node generates a response message 1205 confirming the opt-in result for the advertising campaign message, as well as instructions on how to stop or help (e.g. Reply STOP to end or HELP for help.), along with a link to the user portal included with the exemplary text "You can also manage your opt-in information at https://bitly/123". Thus, once the user clicks the link https://bit.ly/123, the user can access the user portal to manage his/her consent and personal profile centrally and securely.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method for consent and campaign management, the method comprising:
    transmitting, by an enterprise, an opt-in request to a user, the opt-in request for inviting the user to consent to receive one or more messages related to a campaign, wherein the opt-in request comprises a link to a blockchain computer network;
    generating a single-use token in response to the user accessing the blockchain computer network via the link to the blockchain computer network;
    transmitting the single-use token to the user;
    responsive to the user logging into the blockchain computer network using the single-use token, issuing a private key to the user;
    receiving a user's response to the opt-in request, wherein the user's response includes a user's personal data;
    encrypting the user's personal data using the private key and storing the user's personal data in an off-chain database;
    logging the user's response to the opt-in request into the blockchain computer network;
    validating the user's opt-in response as consent to receive messages pertaining to the campaign;
    transmitting the campaign messages to the user over one or more of, an email gateway, an SMS (Short Messaging Service) gateway, an IM (Instant Messaging Gateway) and a voice gateway, based upon the validation of the user's opt-in response; and
    logging delivery of the campaign message into the blockchain computer network.

2. The method of claim 1, wherein the campaign message is a message pertaining to an advertising campaign, a customer loyalty program, a service or contract between the enterprise and the user.

3. The method of claim 1, further comprising prior to transmitting by the enterprise, an opt-in request to a user, registering the campaign generated by the enterprise with the blockchain computer network.

4. The method of claim 3, further comprising prior to registering the campaign in the blockchain network:
    registering the enterprise with the blockchain computer network; and
    creating, by the enterprise, the campaign in the blockchain computer network.

5. The method of claim 1, wherein the opt-in request is transmitted to the user via an electronic communication selected from the group consisting of a Short Message Service (SMS) message, an email, and an instant message.

6. The method of claim 1, further comprising, issuing a public key to the user and wherein the user stores one or more of the private key and the public key in a personal wallet or a QR (Quick Response) code.

7. The method of claim 1, wherein validating the user's opt-in response as consent to receive messages pertaining to the campaign further comprises creating a user profile in the blockchain computer network if the user does not exist in the blockchain computer network.

8. A consent and campaign management system, the system comprising:
    an enterprise node for;
    transmitting an opt-in request to a user, the opt-in request for inviting the user to consent to receive one or more messages related to a campaign, wherein the opt-in request comprises a link to a blockchain computer network;
    generating a single-use token in response to the user accessing the blockchain network via the link to the blockchain computer network;
    transmitting the single-use token to the user;
    responsive to the user logging into the blockchain network using the single-use token, issuing a private key to the user;
    receiving a user's response to the opt-in request, wherein the user's response includes user's personal data;
    encrypting the user's personal data using the private key and storing the user's personal data in an off-chain database;
    logging the user's response to the opt-in request into the blockchain computer network;
    an engagement node for;
    validating the user's opt-in response as consent to receive messages pertaining to the campaign;
    transmitting the campaign message to the user over one or more of, an email gateway, an SMS (Short Messaging Service) gateway, an IM (Instant Messaging Gateway) and a voice gateway, based upon the validation of the user's opt-in response; and
    logging delivery of the campaign message into the blockchain computer network.

9. The system of claim 8, wherein the campaign message is a message pertaining to an advertising campaign, a customer loyalty program, a service or contract between the enterprise and the user.

10. The system of claim 8, wherein the enterprise node is further for, prior to transmitting an opt-in request to a user, generating the campaign and registering the campaign with the blockchain computer network.

11. The system of claim 10, wherein the enterprise node is further for, prior to registering the campaign in the blockchain computer network, registering the enterprise with the blockchain computer network and creating the campaign in the blockchain computer network.

12. The system of claim 8, wherein the opt-in request is transmitted to the user via an electronic communication selected from the group consisting of a Short Message Service (SMS) message, an email, and an instant message.

13. The system of claim 8, wherein the enterprise node is further for issuing a public key to the user and wherein the user stores one or more of the private key and the public key in a personal wallet or a QR (Quick Response) code.

14. The system of claim 8, wherein validating the user's opt-in response as consent to receive messages pertaining to the campaign further comprises creating a user profile in the blockchain computer network if the user does not exist in the blockchain computer network.

15. One or more non-transitory computer-readable media having computer-executable instructions for performing a method of running a software program on a computing device, the computing device operating under an operating system, the method including issuing instructions from the software program comprising:
- transmitting, by an enterprise, an opt-in request to a user, the opt-in request for inviting the user to consent to receive one or more messages related to a campaign, wherein the opt-in request comprises a link to a blockchain computer network;
- generating a single-use token in response to the user accessing the blockchain computer network via the link to the blockchain computer network;
- transmitting the single-use token to the user;
- responsive to the user logging into the blockchain computer network using the single-use token, issuing a private key to the user;
- receiving a user's response to the opt-in request, wherein the user's response includes a user's personal data;
- encrypting the user's personal data using the private key and storing the user's personal data in an off-chain database;
- logging the user's response to the opt-in request into the blockchain computer network;
- validating the user's opt-in response as consent to receive messages pertaining to the campaign;
- transmitting the campaign message to the user over one or more of, an email gateway, an SMS (Short Messaging Service) gateway, an IM (Instant Messaging Gateway) and a voice gateway, based upon the validation of the user's opt-in response; and
- logging delivery of the campaign message into the blockchain computer network.

16. The media of claim 15, further comprising instructions for, prior to transmitting by the enterprise, an opt-in request to a user, registering the campaign generated by the enterprise with the blockchain computer network.

17. The media of claim 16, further comprising instructions for, prior to registering the campaign in the blockchain computer network:
- registering the enterprise with the blockchain computer network; and
- creating, by the enterprise, the campaign in the blockchain computer network.

18. The media of claim 15, wherein the opt-in request is transmitted to the user via an electronic communication selected from the group consisting of a Short Message Service (SMS) message, an email, and an instant message.

19. The media of claim 15, further comprising instructions for, issuing a public key to the user and wherein the user stores one or more of the private key and the public key in a personal wallet or a QR (Quick Response) code.

20. The media of claim 15, wherein validating the user's opt-in response as consent to receive messages pertaining to the campaign further comprises creating a user profile in the blockchain computer network if the user does not exist in the blockchain computer network.

* * * * *